US008661735B2

(12) United States Patent
Zellmer

(10) Patent No.: US 8,661,735 B2

(45) Date of Patent: Mar. 4, 2014

(54) ACTUATION METHOD FOR AN ELECTRIC WINDOW WINDER

(75) Inventor: René Zellmer, Shanghai (CN)

(73) Assignee: Brose Fahrzeugteile GmbH & Co., KG., Hallstadt, Hallstadt (DE)

( * ) Notice: Subject to any disclaimer, the term of this patent is extended or adjusted under 35 U.S.C. 154(b) by 87 days.

(21) Appl. No.: 13/127,991

(22) PCT Filed: Nov. 4, 2009

(86) PCT No.: PCT/EP2009/007886

§ 371 (c)(1), (2), (4) Date: Jun. 17, 2011

(87) PCT Pub. No.: WO2010/057577

PCT Pub. Date: May 27, 2010

(65) Prior Publication Data

US 2012/0090240 A1 Apr. 19, 2012

(30) Foreign Application Priority Data

Nov. 22, 2008 (DE) ........................ 10 2008 058 588

(51) Int. Cl.
*E05F 11/38* (2006.01)

(52) U.S. Cl.
USPC .... 49/349; 49/506; 49/502; 49/28; 296/146.2

(58) Field of Classification Search
USPC ............ 49/506, 348, 349, 352, 502, 68, 142, 49/26, 28, 136, 207; 296/146.2 X, 146.3, 296/146.16; 318/445

See application file for complete search history.

(56) References Cited

U.S. PATENT DOCUMENTS 4,884,070 A * 11/1989 Hannaford ................. 340/13.38
5,110,175 A * 5/1992 Fischbach ..................... 296/117
5,451,849 A * 9/1995 Porter et al. ................. 318/466

(Continued)

FOREIGN PATENT DOCUMENTS

CH 176787 A 4/1935
DE 4325501 A1 2/1995
DE 202006003285 U1 7/2007

OTHER PUBLICATIONS

PCT International Preliminary Report on Patentability from corresponding International Application No. PCT/EP2009/007886 dated May 31, 2011.

(Continued)

*Primary Examiner* — Jerry Redman

(74) *Attorney, Agent, or Firm* — Mendelsohn, Drucker & Dunleavy, P.C.; Steve Mendelsohn

(57) ABSTRACT

The invention, in certain embodiments, specifies an actuation method for an electric window winder (10) of a front window (1) of a vehicle (3) without a B-pillar and with a moveable rear window (2), which actuation method allows all the windows to be closed in a particularly rapid and reliable manner. According to the method, provision is made for the front window (1) to be closed by the window winder (10), taking into consideration a trapping-prevention means (25). Furthermore, a closing condition is checked during the actuation method. If, on account of this closing condition, it can be assumed that trapping prevention-related reversing of the front window (1) has been caused by a collision with the rear window (2), the front window (1) is closed again after the trapping prevention-related reversing operation.

20 Claims, 1 Drawing Sheet

(56) References Cited

U.S. PATENT DOCUMENTS

| | | | | |
|---|---|---|---|---|
| 6,246,199 | B1 * | 6/2001 | Porter et al. | 318/466 |
| 6,297,609 | B1 * | 10/2001 | Takahashi et al. | 318/484 |
| 6,601,905 | B1 * | 8/2003 | Klauzenberg et al. | 296/107.07 |
| 6,630,807 | B2 * | 10/2003 | Pehrson et al. | 318/445 |
| 6,733,065 | B2 * | 5/2004 | Schindler et al. | 296/107.07 |
| 6,773,053 | B2 * | 8/2004 | Richter et al. | 296/146.16 |
| 6,867,562 | B2 * | 3/2005 | Weiner et al. | 318/264 |
| 2003/0052635 | A1 * | 3/2003 | Schindler et al. | 318/445 |
| 2003/0116994 | A1 * | 6/2003 | Richtor et al. | 296/146.16 |
| 2007/0055415 | A1 * | 3/2007 | Taki et al. | 701/2 |
| 2008/0266051 | A1 * | 10/2008 | Taki et al. | 340/5.1 |
| 2011/0192088 | A1 * | 8/2011 | Zellmer et al. | 49/358 |

OTHER PUBLICATIONS

International Search Report for corresponding PCT Application No. PCT/EP2009/007886; Date of mailing: May 28, 2010 (6 pages).

* cited by examiner 8
7
15
16
14
3
13
1
2
s
17
5
12
14
6
9
26
25
n
M1
M2
31
11
10
4
20
22
23
21 n
30
t 35
36
N
N
N
37
Y
39
40
Y
41
Y
43
N
42
Y
38

ACTUATION METHOD FOR AN ELECTRIC WINDOW WINDER

BACKGROUND

1. Field of the Invention

The invention relates to an actuation method for an electric window winder for closing a front window of a vehicle without a B-pillar and with a moveable rear window. The invention also relates to an apparatus for carrying out the method.

2. Description of the Related Art

The connection pillar between the vehicle floor and the vehicle roof in the center of a passenger compartment is usually referred to as the B-pillar. Many vehicles, in particular coupes or convertibles, do not have such a B-pillar. Such vehicles are referred to as vehicles without a B-pillar in this document.

A front side window, that is to say the window in the driver's or passenger door and referred to as the front window in the text which follows, and a rear side window, which is usually referred to as the rear window, meet one another in such a vehicle without a B-pillar. The front window and the rear window are generally separated from one another only by a sealing lip.

During a closing operation, the rear window is often not moved upward in a straight line but rather moves upward and forward substantially on an S-shaped path. If the front window and the associated rear window are closed simultaneously, for example during the course of a central locking function, the rear window occasionally collides with the front window. As a result, a trapping-prevention means, which is usually present, in particular of the front window can initiate an undesired reversing operation of said front window. Particularly in connection with a central locking function—this may disadvantageously lead to the front window remaining open while a vehicle user leaves the vehicle in the belief that the front window is closed.

This problem is conventionally solved by the front window and the associated rear window being sequentially actuated and accordingly closed one after the other in the case of a central locking function. However, this disadvantageously requires a comparatively long period of time until all the windows are closed.

SUMMARY

The invention, in certain embodiments, is based on the object of specifying an actuation method for an electric window winder of a front window of a vehicle without a B-pillar and with a moveable rear window, which actuation method allows all the windows to be closed in a particularly rapid and reliable manner.

With regard to the method, this object is achieved, according to certain embodiments of the invention, by virtue of an actuation method, in which the front window is closed by the window winder, taking into consideration a trapping-prevention means. Furthermore, a closing condition is checked during the actuation method. If, on account of this closing condition, it can be assumed that a trapping prevention-related reversing operation of the front window has been caused by a collision with the rear window, the front window is closed again after the trapping prevention-related reversing operation.

In this case, the actuation method relates, in particular, to a method for actuating an electric motor of the electric window winder in question. In this case, a front side window in the driver's or passenger door of a vehicle is referred to as a front window. The side window in the vehicle, which side window is directly, that is to say separated only by a sealing lip, adjacent to the rear of the front window in a vehicle without a B-pillar is referred to as a rear window.

A function of the window winder actuation system, which function reverses the window, in this case the front window, when said window encounters an obstruction during a closing operation, is referred to as trapping prevention. Said trapping prevention can be realized firstly by what is known as limiting the excess force of the electric window winder, with the window winder being actuated to perform a reversing operation when a so-called excess force of its electric motor exceeds a certain threshold value. Secondly, trapping prevention can also be initiated in the case of a reduction in rotation speed or an increase in torque of the electric motor in question.

In the present actuation method, a closing condition is advantageously checked and said check is used to make a decision as to whether the trapping-prevention means is initiated by an actual trapping event or whether the trapping-prevention means is mistakenly initiated by a collision with the upward (and forward) moving rear window. In this case, the closing condition used is a or any condition on the basis of which a decision can be made as to whether the front window and the rear window are simultaneously closed or not.

Undesired initiation of the trapping-prevention means on account of a collision between the rear window and the front window is often caused by an incorrectly set window winder of the rear window. However, by virtue of the presented method, incorrect initiation of the trapping-prevention means does not present a problem, and therefore the window winder of the rear window advantageously has to be set comparatively less exactly during production—and later during servicing. In addition, any possible wear-related adjustment of the window winder does not present a problem thanks to the actuation method according to the invention.

On account of the presented actuation method, it is possible for the front window and the rear window, in particular during the course of a central locking function, to be able to be actuated simultaneously in order to be closed. As a result, a significant time saving is made when closing the windows. In addition, the presented actuation method allows the windows to be closed in a particularly reliable manner. This specifically prevents the front window remaining open—after a reversing operation mistakenly initiated by the rear window.

In one preferred embodiment of the actuation method, a central locking function is used as the closing condition. In the case of such a central locking function, all the windows will (simultaneously) move upward (in a convertible a top may also be closed) and the vehicle doors will be closed. As the closing condition, a check is therefore made as to whether the window winder is actuated to close the front window on account of the central locking function. In this case, a check is preferably made as to whether the central locking function—and therefore the window closing operation—is initiated by radio remote control by a car key. If the front window is closed as a result of the central locking function, it can be assumed that the trapping prevention is caused by collision with the rear window which is probably moving upward in this case too. Accordingly, the front window is closed again after the reversing operation.

In a further embodiment of the actuation method, in the case of a convertible without a B-pillar, a check is additionally or alternatively made, as a closing condition, as to whether the window winder is activated to close the front window as a result of a top closing function, that is to say, for example, by operating a corresponding button in the vehicle or on the car key. In this case, all the windows may again be simultaneously moved upward when the top is closed. If the window winder is actuated to close the front window as a result of the top closing function, the front window is closed again after the reversing operation since it can again be assumed that there is no trapping event.

If the window winder is activated to close the front window by a window winder button in the vehicle—that is to say manually—a check is additionally made, as a closing condition, as to whether the associated rear window is also closed at the same time. If this is the case, it can again be assumed that reversing of the front window has been mistakenly initiated by collision with the rear window, and therefore the front window is closed again after the reversing operation. If this is not the case, the front window is not closed again after the reversing operation.

In a particularly advantageous embodiment of the actuation method, provision is made for the trapping-prevention means of the front window to be initiated at a lower initiation threshold in the case of a new reversing operation. If the first reversing operation was initiated by a genuine trapping event, even though the closing condition or conditions had been checked, it is accordingly possible to ensure that the front window is reliably reversed again in the case of a new closing operation (and a new genuine trapping event).

With regard to the apparatus, the object is achieved, according to certain embodiments of the invention. A corresponding actuation unit is designed to actuate an electric window winder for a front window of a vehicle without a B-pillar and with a moveable rear window according to the above-described actuation method. The actuation unit expediently comprises a checking unit for this purpose, said checking unit being designed to check the closing condition or conditions. In this case, the checking unit is preferably in the form of a software module.

A vehicle can advantageously also be retrofitted with this actuation unit or with the checking unit which is implemented as software in a comparatively simple manner. As a result, even existing vehicles can be equipped with a function for closing windows in a rapid and reliable manner.

BRIEF DESCRIPTION OF THE DRAWINGS

An exemplary embodiment of the invention will be explained in greater detail below with reference to a drawing, in which.

Parts and variables which correspond to one another are always provided with the same reference symbols in all of the figures.

DETAILED DESCRIPTION

Figure 1:
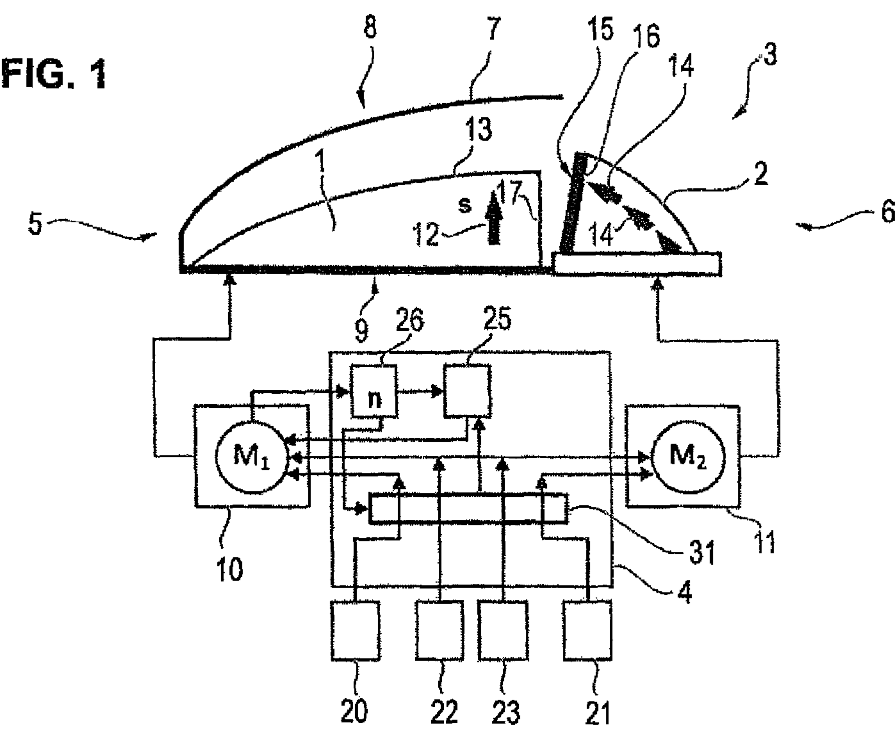
FIG. 1 is a schematic illustration of an actuation unit for electrically closing a front window and also a rear window of a vehicle without a B-pillar (convertible)

FIG. 1 shows, at the top in the illustration, a schematic side view of a front window 1 (on the left in the illustration) and also a rear window 2 (on the right in the illustration) of a convertible 3—of which a detail is indicated only roughly—without a B-pillar. An actuation unit 4 for electrically opening and closing the windows is schematically sketched at the bottom of the illustration.

The window in one of the side vehicle doors of the convertible 3 which—in the intended installation position illustrated here—is directed substantially toward a front end 5 of the convertible 3 is referred to as a front window 1. One of the side windows which—once again in the intended installation position—is directed toward a rear end 6, which is opposite the front end, of the convertible 3, that is to say a side window in the rear of the vehicle, is referred to as the rear window 2. The front window 1 and the rear window 2 on the driver's side of the convertible 3 are illustrated here. The following description analogously applies to the windows on the passenger side of the convertible 3 too.

An end which is associated with an indicated top 7 of the convertible 3 is referred to as the top end 8 of the convertible 3, while an end which is opposite said top end is referred to as the bottom end 9.

The terms "top end", "bottom end", "front end" and "rear end" and the corresponding terms "top", "bottom", "front" and "rear" relate to the intended orientation of the convertible 3 and in the text which follows will be used independently of its actual position in the surrounding area. These terms are likewise used, in particular, for all components which are fitted to the convertible 3 as intended.

Both the front window 1 and the rear window 2 can be moved by in each case a schematically indicated electric window winder 10 and, respectively, 11. In this case, the front window 1 is moved upward and downward by the window winder 10 substantially with a linear movement. This movement is identified by the arrow 12. As it moves, said window covers the path s by way of its top edge 13. In the closed state, the top edge 13 butts against the (closed) top 7.

The rear window 2 is moved upward and forward by the window winder 11 with a movement which is identified by the arrows 14. The rear window 2 is provided with a sealing lip 16 at its edge 15 which is at the front in the closed state. Said rear window rests in a sealing manner against a rear edge 17 of the front window 1 by way of said sealing lip when both windows are in the closed state.

Each window winder 10, 11 respectively comprises an electromotive drive which is referred to as motor $M_1$ or, respectively, $M_2$ in the text which follows. Both the first motor $M_1$ and the second motor $M_2$ are actuated by means of the actuation unit 4. In this case, the actuation unit 4 can be integrated separately in the driver's door or else in one of the electric window winders 10, 11.

The two window winders 10, 11 and their motors $M_1$ and, respectively, $M_2$ can be activated by different switches or functions for closing the windows, with each operation of the window winders 10, 11 in each case being performed by means of the actuation unit 4. On the one hand, the motor $M_1$ is actuated by operating a first window winder button 20, which is associated with the front window 1, separately for the purpose of closing the front window 1. Accordingly, the motor $M_2$ is likewise actuated separately by operating a second window winder button 21 which is associated with the rear window 2.

On the other hand, the two motors $M_1$, $M_2$ are simultaneously activated for the purpose of closing the associated windows when the top 7 is intended to be closed by operation of a button 22 for the top. In this case, both the top 7 and also the front window 1 and the rear window 2 are closed. The button 22 for the top is integrated, for example, in the dashboard or in a center console of the convertible 3.

Furthermore, the two motors $M_1$, $M_2$ are simultaneously activated for the purpose of closing the associated windows when a central locking function is initiated. This is done, for example, by operating a radio key 23, but may also be done by operating a correspondingly designed door lock in the driver's door. In this case, the top 7 and also the front window and the rear window 2 are closed once again. In addition, the vehicle doors are locked.

In order to reduce the risk of an object, for example a body part, becoming trapped between the top edge 13 of the front window 1 and the top 7 when the front window 1 is electrically closed, the actuation unit 4 comprises a trapping-prevention means 25 which is implemented on the basis of software or as an algorithm in a control electronics system of the window winder and which is coupled to a rotation speed meter 26. The rotation speed meter 26 detects the rotation speed n of the motor $M_1$ and forwards the detected rotation speed to the trapping-prevention means 25. If the rotation speed n reduces, the trapping-prevention means 25 determines a trapping event in relation to the front window 1. The trapping-prevention means 25 then triggers the motor $M_1$ to change the rotation direction, and therefore to reverse the front window 1.

Figure 2:
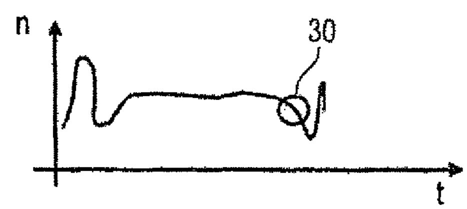
FIG. 2 shows a rotation speed profile of a motor of an electric window winder.

FIG. 2 shows the rotation speed n as a function of time t and, correspondingly, of the position s of the front window 1 when said front window is closed. In this case, a reduction in the rotation speed is established in a region 30. This reduction in the rotation speed can, on the one hand, be caused by an actual trapping event. On the other hand, such a reduction in rotation speed can also occur when—as illustrated in FIG. 1—the front window 1 and the rear window 2 are closed simultaneously and the sealing lip 16 meets the rear edge 17 of the front window 1. In this case, the trapping-prevention means 25 may also trigger the window winder 10 or the motor $M_1$ to reverse the front window 1.

Figure 3:
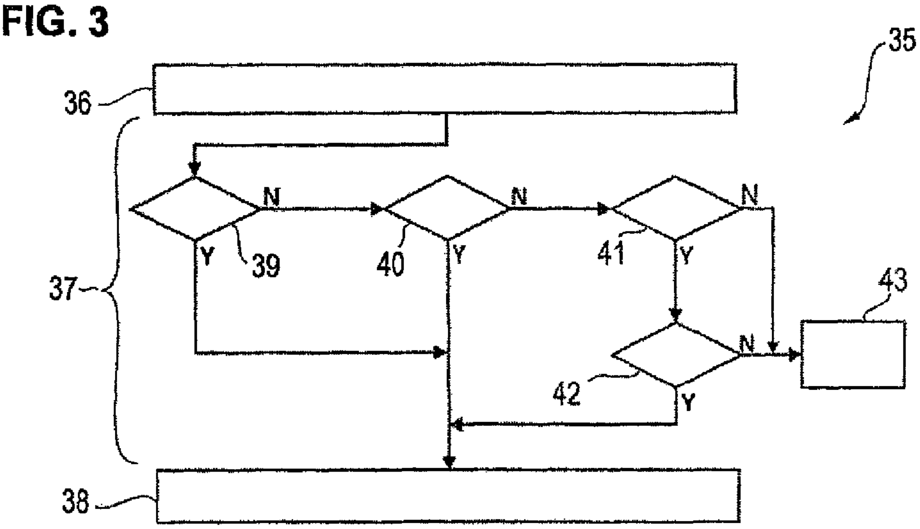
FIG. 3 shows a flowchart of an actuation method of the actuation unit for closing the front window in a reliable manner.

In order to prevent such a supposed trapping event leading to the front window 1 remaining in the open position, a checking unit 31 (FIG. 1) is integrated in the actuation unit 4. The checking unit 31 is designed firstly to identify whether the front window 1 is reversed. To this end, said checking unit is coupled to the rotation speed meter 26. Furthermore, the checking unit 31 is designed to identify the buttons or switches 20 to 23 by means of which the motors $M_1$ and $M_2$ have been actuated for the purpose of closing the respectively associated windows. In addition, the checking unit 31 is designed to actuate the motor $M_1$ and the trapping-prevention means 25 in accordance with an actuation method according to the flowchart 35 illustrated in FIG. 3.

In this case, it is initially established in a first step 36 that the front window 1 is reversed. The checking unit 31 then checks, in a checking sequence 37 using a plurality of closing conditions, whether there is a comparatively high probability that the trapping event has been caused by a collision with the rear window 2, and therefore can be classified a false trapping event. If this is the case, the motor $M_1$ is, in a step 38, initially actuated to again close the front window 1. Secondly, in step 38, a signal is output to the trapping-prevention means 25 to reduce the initiation threshold, so that the front window 1 is now reversed earlier in the case of another trapping event.

In the checking sequence 37, a check is made in a first check 39 as to whether the motor $M_1$ has been actuated by operation of the radio key 23. If this is the case, it is likely that there is no trapping event and step 38 is performed. If this is not the case, a check is made in a second check 40 as to whether the motor $M_1$ has been actuated by operation of the button 22 for the top. If this is the case, it can be assumed that the trapping event is false and step 38 is performed. If this is not the case, a check is made in a third check 41—redundant—as to whether the motor $M_1$ has been actuated by operation of the window winder button 20. If this is not the case, it can be assumed that the trapping event is genuine, and therefore no action is initiated in step 43 and therefore the front window 1 remains reversed. If the third check 41 indicates that the motor $M_1$ has been actuated by operation of the window winder button 20, a check is made in a further check 42 as to whether the motor $M_2$ has been actuated to close the rear window 2 by operation of the window winder button 21 at the same time. If this is the case, it is again assumed that the trapping event is false, and therefore the front window 1 is again closed with a reduced initiation threshold of the trapping-prevention means 25 in step 38. If the motor $M_2$ was not simultaneously actuated to close the rear window 2, it can be assumed that the trapping event is genuine, and therefore no action is initiated in step 43 and therefore the front window 1 remains reversed.

The invention claimed is:

1. A method for an actuation unit operating moveable front and rear windows of a vehicle without a B-pillar, the method comprising:

(a) the actuation unit causing the front and rear windows to move concurrently and respectively towards a front-window closed position and a rear-window closed position;

(b) the actuation unit then detecting a collision between the front window and the rear window;

(c) the actuation unit then automatically causing the front window to move towards a front-window open position; and (d) the actuation unit then automatically causing the front window again to move towards the front-window closed position.

2. The method of claim 1, wherein step (b) comprises the actuation unit determining that step (a) resulted from a central locking function.

3. The method of claim 2, wherein step (b) comprises the actuation unit determining that the central locking function was initiated using a car key.

4. The method of claim 1, wherein:

the vehicle is a convertible; and step (b) comprises the actuation unit determining that step (a) resulted from a top closing function.

5. The method of claim 1, wherein step (b) comprises the actuation unit determining that step (a) resulted from activation of front and rear window winder buttons for the front and rear windows, respectively.

6. The method of claim 1, wherein:

during step (a), the actuation unit implements a trapping-prevention technique based on a first initiation threshold level; and during step (d), the actuation unit implements the trapping-prevention technique based on a second initiation threshold level lower than the first initiation threshold level.

7. An apparatus comprising an actuation unit for operating moveable front and rear windows of a vehicle without a B-pillar, wherein the actuation unit is configured to:

(a) cause the front and rear windows to move concurrently and respectively towards a front-window closed position and a rear-window closed position;

(b) then detect a collision between the front window and the rear window;

(c) then automatically cause the front window to move towards a front-window open position; and (d) then automatically cause the front window again to move towards the front-window closed position.

8. The apparatus of claim 7, wherein the actuation unit is configured to detect the collision by determining that the concurrent movement of the front and rear windows resulted from a central locking function.

9. The apparatus of claim 8, wherein the actuation unit is configured to detect the collision by determining that the central locking function was initiated using a car key.

10. The apparatus of claim 7, wherein:

the vehicle is a convertible; and the actuation unit is configured to detect the collision by determining that the concurrent movement of the front and rear windows resulted from a top closing function.

11. The apparatus of claim 7, wherein the actuation unit is configured to detect the collision by determining that the concurrent movement of the front and rear windows resulted from activation of front and rear window winder buttons for the front and rear windows, respectively.

12. The apparatus of claim 7, wherein:

the actuation unit is configured to implement a trapping-prevention technique based on a first initiation threshold level during the concurrent movement of the front and rear windows; and the actuation unit is configured to implement the trapping-prevention technique based on a second initiation threshold level lower than the first initiation threshold level while again moving the front window towards the front-window closed position.

13. The apparatus of claim 7, wherein the apparatus is the vehicle.

14. An apparatus comprising an actuation unit for operating moveable front and rear windows of a vehicle without a B-pillar, wherein the actuation unit comprises:

(a) means for causing the front and rear windows to move concurrently and respectively towards a front-window closed position and a rear-window closed position;

(b) means for then detecting a collision between the front window and the rear window;

(c) means for then automatically causing the front window to move towards a front-window open position; and (d) means for then automatically causing the front window again to move towards the front-window closed position.

15. The apparatus of claim 14, wherein means (b) is configured to detect the collision by determining that the concurrent movement of the front and rear windows resulted from a central locking function.

16. The apparatus of claim 15, wherein means (b) is configured to detect the collision by determining that the central locking function was initiated using a car key.

17. The apparatus of claim 14, wherein:

the vehicle is a convertible; and means (b) is configured to detect the collision by determining that the concurrent movement of the front and rear windows resulted from a top closing function.

18. The apparatus of claim 14, wherein means (b) is configured to detect the collision by determining that the concurrent movement of the front and rear windows resulted from activation of front and rear window winder buttons for the front and rear windows, respectively.

19. The apparatus of claim 14, wherein:

means (a) is configured to implement a trapping-prevention technique based on a first initiation threshold level during the concurrent movement of the front and rear windows; and means (d) is configured to implement the trapping-prevention technique based on a second initiation threshold level lower than the first initiation threshold level while again moving the front window towards the front-window closed position.

20. The apparatus of claim 14, wherein the apparatus is the vehicle.

* * * * *